(No Model.)

W. H. WIESTER.
OVEN.

No. 504,184. Patented Aug. 29, 1893.

Witnesses,
J. H. House
J. A. Bayless

Inventor,
William H. Wiester
By Dewey & Co.
attys

UNITED STATES PATENT OFFICE.

WILLIAM H. WIESTER, OF SAN FRANCISCO, CALIFORNIA.

OVEN.

SPECIFICATION forming part of Letters Patent No. 504,184, dated August 29, 1893.

Application filed May 5, 1893. Serial No. 473,140. (No model.)

*To all whom it may concern:*

Be it known that I, WILLIAM H. WIESTER, a citizen of the United States, residing in the city and county of San Francisco, State of California, have invented an Improvement in Ovens; and I hereby declare the following to be a full, clear, and exact description of the same.

My invention relates to an oven which is especially adapted to be used in connection with gas, oil and vapor stoves; and it consists in certain details of construction which will be more fully explained by reference to the accompanying drawings, in which—

Figure 1:
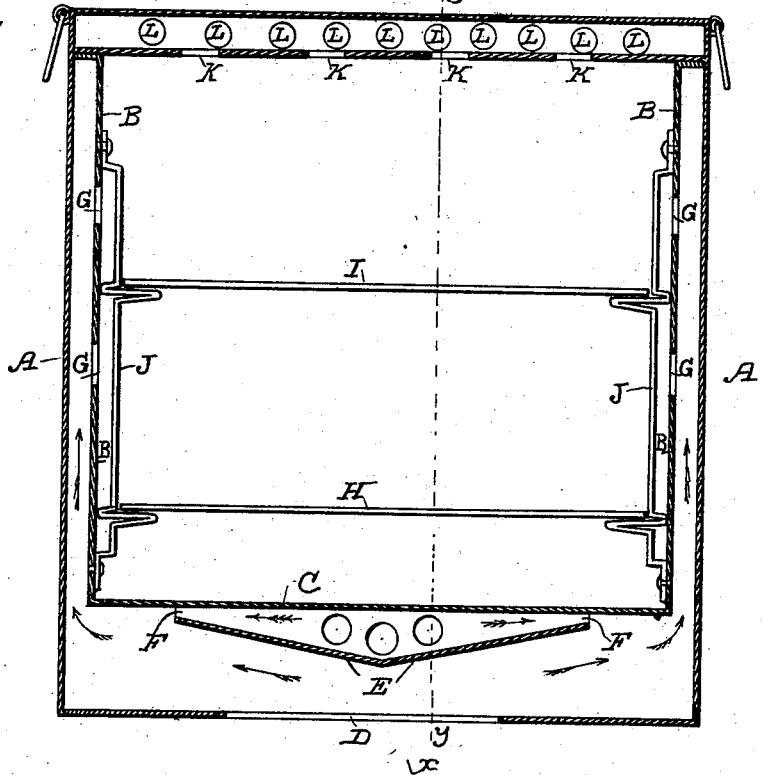
Figure 2:
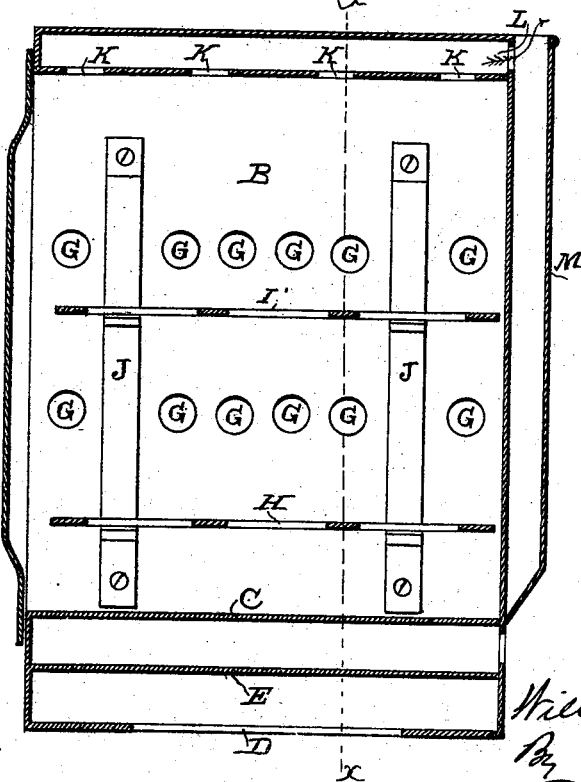

Figure 1 is a vertical section of my improved oven on the dotted line of $x$—$x$ Fig. 2. Fig. 2 is a section on the dotted line $y$—$y$ of Fig. 1.

In the construction of ovens of this class, various means for admitting and distributing the heat have been devised.

The object of my invention is to provide an improved distribution and regulation of the heat within and around the oven, and to so regulate the heat within the oven that all portions are submitted to an approximately equal temperature during the process of cooking within it.

My oven consists of an exterior case A having interior side walls B, between which and the exterior case is a space for the passage of heat. The inner bottom C of the oven is sufficiently elevated above the outer bottom to leave a considerable space. An opening D is made in the outer bottom through which heat is admitted into this chamber between the two bottoms.

E is a diaphragm, the outer edges of which are fixed to the inner bottom of the oven, and the central portion inclines downwardly toward the opening D through which the heat passes, thus leaving a chamber between the lowest angle of the diaphragm and the bottom of the oven. At one side holes F are made which open from the exterior into the space between this diaphragm and the oven bottom. The sides, where the diaphragm approaches the bottom of the oven are cut away or otherwise so formed that air which is admitted through the holes F into this space, becoming highly heated by the impinging of the flame upon the lower part of the diaphragm, will pass out through these side openings and thence pass into the vertical chambers upon each side of the oven. This serves a double purpose, first, to prevent the intense direct heat from overheating the bottom of the oven, and thus burning any food placed on the lower shelf; and, secondly, to provide a large volume of highly heated air which continually passes out and up through the side channels of the oven. From these side channels, openings C are made through the inner wall of the oven.

In the present case I have shown the oven constructed with two racks, the first rack H being near the bottom of the oven, and the second rack I at a point approximately midway between the bottom and the top. These racks are removably supported upon lugs or standards J fixed within the oven in any suitable or desired manner. The lower series of holes through the sides of the oven opens into the space between the two racks, and thus furnishes a supply of heated air which flows over the articles which are supported upon the lower rack, thus furnishing sufficient heat to cook the top, while the radiated heat from the bottom of the oven is sufficient to cook the bottom of the articles on the lower rack. The same heat which enters through these lower openings also serves to cook the bottom of the articles placed upon the upper shelf, and the heat which enters through the upper row of openings, passing over the top of the articles on the upper shelf, serves to cook these articles. I have thus even distribution of heat through all parts of the oven, and the upper and lower surfaces of articles upon both sets of shelves, will be equally exposed and equally cooked. The inner top of the oven is perforated with holes K through which the heat escapes from the oven into the independent chamber formed between the inner and outer top of the oven, and having no connection with the side chambers. From this chamber the heated air passes out through a series of holes L in the rear part and into the open air. The supplemental back M extending over the whole back of the oven retains a sheet of warm air between the outer and inner backs of the oven, and thus prevents the latter from being cooled by the outside air. The oven door is hinged to the front, and, if desired, may be in the same manner made double for the purpose of containing a non-conducting sheet of air and protecting the front of the oven from cooling or radiation.

Having thus described my invention, what I claim as new, and desire to secure by Letters Patent, is—

1. An oven having double top and bottom, and side walls with independent intervening chambers, an opening at the bottom through which heat is admitted into the bottom chamber, a diaphragm fixed in said chamber against which the heat impinges and by which it is directed into the side chambers, and the bottom of the oven protected from the direct action of the heat, openings through the inner walls of the side chambers whereby the heated air is admitted and distributed through the interior of the oven, and an independent top chamber with openings through the top of the oven, through which the heat escapes into the upper chamber, and openings in the rear of said chamber through which the heat escapes, substantially as herein described.

2. An oven having double walls forming side chambers, a double bottom through the outer portion of which heat is admitted, a diaphragm fixed in the bottom chamber and forming an independent chamber between itself and the bottom of the oven, openings leading from the external air into this independent chamber and other openings at the sides of said chamber through which the air escapes and enters the side chambers of the oven, and one or more series of openings from the side chambers into the oven, openings through the top of the oven into an independent top chamber, and openings at the rear of said chamber through which the heat escapes, substantially as herein described.

3. In an oven, connected side and bottom chambers and an independent top chamber, a double series of openings from the side chambers into the oven, and openings by which the heat escapes from the oven into the top chamber, horizontal removable racks, with supporting standards by which the lowermost rack is supported above the bottom of the oven, and the second one intermediate between the upper and lower series of side openings, a hole in the bottom of the bottom chamber through which heat is admitted, a diaphragm by which the heat is diverted into the side chambers of the oven, an independent chamber formed between said diaphragm and the bottom of the oven, holes opening from the exterior into said chamber for the admission of air, and openings upon each side through which the heated air escapes from said chamber into the side chambers of the oven, substantially as herein described.

4. In an oven, a chamber beneath the bottom into which the heat is introduced, and a supplemental chamber between the heat opening and the oven bottom, and openings from the exterior into the supplemental chamber for the admission and circulation of air within said chamber, substantially as herein described.

In witness whereof I have hereunto set my hand.

WILLIAM H. WIESTER.

Witnesses:
S. H. NOURSE,
J. A. BAYLESS.